Patented Sept. 19, 1939

2,173,144

UNITED STATES PATENT OFFICE 2,173,144

METHOD OF PREPARING NORMAL FERRIC SULPHATE

William S. Wilson, Brookline, and John F. White, Medford, Mass., assignors, by mesne assignments, to Monsanto Chemical Company, a corporation of Delaware No Drawing. Application March 31, 1936, Serial No. 71,878

12 Claims. (Cl. 23—126)

The present invention relates to the manufacture of normal ferric sulphate in a uniform pellet form that is substantially completely soluble in water, anhydrous and free of sulphuric acid.

One of the principal uses for normal ferric sulphate depends upon its ability to coagulate from an aqueous solution over a comparatively wide range of pH values forming a ferric hydroxide floc that is capable of carrying down with it suspended matter that may be present in an aqueous medium. This principle is commonly employed in the treatment of municipal and industrial water supplies and the clarification of waste water effluents. Ferric sulphate which is rich in sulphuric acid, commonly referred to as "acid sulphate", is lean in the ferric hydroxide forming principle; ferric sulphates which are rich in $Fe_2O_3$, commonly referred to as "basic sulphates", are of restricted solubility.

When ferric oxide and sulphuric acid react, a relatively large number of acid and basic sulphates, in addition to the normal sulphate, may be obtained depending upon the condition of the reaction, the ratio of the ingredients, etc.

The following constitute some of the compounds which have been identified:

$$Fe_2O_3 4SO_3 3H_2O$$
$$Fe_2O_3 3SO_3$$
$$Fe_2O_3 3SO_3 6H_2O$$
$$Fe_2O_3 3SO_3 7H_2O$$
$$Fe_2O_3 2SO_3 H_2O$$
$$Fe_2O_3 2SO_3 5H_2O$$
$$2Fe_2O_3 5SO_3 17H_2O$$
$$3Fe_2O_3 4SO_3 9H_2O$$

In our co-pending application, Serial Number 725,901, filed May 16, 1934, which issued as U. S. Patent No. 2,149,327 of which the present application is a continuation in part, we have disclosed a process in which aqueous sulphuric acid is reacted with pyrite cinders to form a solution of normal ferric sulphate. Subsequently, the solution is mixed with pulverized anhydrous ferric sulphate under conditions whereby pellets of substantial dry, hydrated ferric sulphate are formed that are then heated in a kiln to drive off the water of hydration and any free acid. While the product so prepared is of excellent quality, the nature of the several operations makes the cost of manufacture relatively high as compared to the cost of the raw materials. This invention embodies certain features of our former invention and includes others, whereby the cost of the product is very materially reduced, while at the same time the quality and character of the product are substantially maintained.

The present invention is calculated to avoid the cost of dissolution of the ferric sulphate in water and the evaporation of the resulting solution, while at the same time to simplify the manufacture of a product having the valuable, desirable properties of the product made according to our co-pending application.

According to the present invention concentrated sulphuric acid, preferably over 85% $H_2SO_4$, is added to and reacted in a mill of the edge runner type containing finely ground burnt pyrite or other source of $Fe_2O_3$, under temperature conditions which attain at least 140° C. and which are so regulated as to assure rapid reaction. As soon as all the acid has been added and while the partially reacted mixture is semi-fluid to avoid sedimentation of the unreacted $Fe_2O_3$, and solid ferric sulphate from the sulphuric acid suspending medium, (care being exercised to preserve flowability of the mass) the mixture is discharged from the mill into a reaction bin or pan where the chemical reaction continues. As the temperature of the mass rises, vigorous steaming ensues and the mixture soon sets as a vesicular solid. The resulting solidified product is ground and subsequently pelleted by the addition of sufficient water, dilute sulphuric acid, or aqueous ferric sulphate solution, to induce agglomeration, but insufficient to develop pastiness. The pellets so formed are calcined by direct fire heating at 400°–450° C. pellet temperature for 30 to 60 minutes, or at a higher temperature for a shorter period of time, whereby a substantially anhydrous, acid free product is obtained.

The conditions of operation of our process are such that the reaction between the oxide and the acid is completed quickly and without the application of external heat or use of a substantial excess of either reactant. This result is obtained by a combination of inter-related conditions which are more fully set forth hereinafter. The conditions of the initial reaction are important, especially the fineness of the oxide, the concentration of the acid and the manner and temperature of mixing the ingredients; all to the end that a rapid and complete reaction of the ingredients to form the normal sulphate is realized.

Concentrated acid is important to our process; although the exact concentration depends on many factors, such as the moisture present in the cinder, temperature of the equipment, rate of dissipation of heat from the equipment, temperature of the reactants and the like. In general, it may be said that the concentration of the acid if cold should preferably be above 85%. We have found that 93% sulphuric acid is particularly well suited, although 98% acid or even oleum, that is acid containing an excess of $SO_3$ dissolved therein, may be used. Other conditions being the same, acids of increased strength increase the rate of reaction and raise the maximum temperature attained by the mass. We have found that in general a temperature above 140° C. must be attained and we prefer that the temperature rise considerably above this point, particularly during the later stages of the reaction, that is, after the milling operation is completed and the slurry is discharged into the reaction bin. When a ferric oxide which has been ground until 95% to 98% passes through a two-hundred mesh screen and an acid of approximately 98% $H_2SO_4$ are mixed according to our invention, a temperature of 160° C. is quickly attained. As the material hardens in the reaction bin the temperature rises 20°–50° C., or even more, while at the same time steam is evolved resulting in a vesicular product which tends to dust.

When pulverulent burnt pyrite is stirred with concentrated sulphuric acid, even vigorously, the mixture displays a marked tendency to agglomerate. If the mixture in agglomerated condition is allowed to set under more or less heat insulated conditions, the temperature within the agglomerates increases so rapidly, while at the same time water is being formed due to the chemical reaction, that the agglomerates spall and disintegrate, some times with explosive violence. But more important is the fact that the reaction with the oxide is incomplete, even when an excess of concentrated acid is used.

According to our invention a complete and controllable reaction is possible if the acid and burnt pyrite are mixed and ground under a shearing influence that breaks down the protective layer of ferric sulphate on the surface of the oxide particles. For the purpose of our invention we prefer to use strong acid and finely ground ferric oxide. Ordinary mixing operations are not effective and, in fact, are dangerous. However, we have found that by adding the acid to the pulverulent oxide in a grinder of the edge runner type, such as a Chili mill, a Simpson mixer, or some other mill or muller of this general construction, a rapidly and completely reacting composition is easily obtained.

In general, after equilibrium conditions have been established, that is, after the equipment has become hot, the heat developed during the mixing is sufficient to take care of the process without preheating the raw materials or otherwise supplying external heat, although in order to attain complete reaction in the first few batches of ferric oxide and sulphuric acid and before the equipment has reached equilibrium temperature, it may be desirable to heat the reactants added or the mixer itself.

Considerable leeway may be taken in the mixing operation although, in general, we prefer to charge the mixer initially with all of the oxide to which enough acid is added rapidly to wet the cinder and produce a viscous slurry. For this purpose 50–70% of the total acid is usually sufficient. As the reaction proceeds, the remaining 50–25% of the acid is then added over a period of about 8–10 minutes, while substantially maintaining the viscous consistency of the mass. When all of the acid is added at once, the mixture becomes very fluid, the shearing action of the muller is impaired, the reaction rate is lowered, the output of the equipment is reduced and the product produced is incompletely reacted.

The mixture is discharged from the mill while in a viscous fluid state and completes its reaction in the reacting bin where the temperature rises to 180°–210° C. or even higher. During this time steam is evolved in large quantities. However, when proceeding as described herein, we have experienced no difficulty from explosions.

No external heat is necessary, in fact it may become necessary to abstract heat from the mixer by jacketed cooling means or use of somewhat more dilute acid in order to avoid loss thereof by volatilizations. Excess acid is thus avoided, the normal sulphate is produced to the exclusion of the acid or basic sulphates, yet the mixture is substantially completely reacted, which is important since the subsequent calcination is not an effective means for completing this phase of the reaction.

For many industrial purposes this material will be found to be entirely satisfactory. However, for other purposes a reduction in the amount of ferrous iron, free sulphuric acid and water of hydration is desirable. Moreover, the material displays a tendency to dust and is non-uniform in size. In order to improve some of these qualities of the product, it is removed from the reaction bin, crushed and calcined at 400°–450° C. or higher, preferably in contact with an oxidizing atmosphere. This operation results in the oxidation of ferrous sulphate to ferric sulphate and some unreacted ferric oxide is combined with residual sulphuric acid.

The calcined product though non-uniform will be found to have many of the desirable properties of the preferred product which is made by adding water to the crushed material in a rotating drum type mixer as, for example, a cement mixer, or in an agitating device similar to a screw conveyor. The water so added tends to agglomerate the particles. The amount to be added will vary according to the requirements of the material being agglomerated, the size of pellets desired, the rate of agitation, etc. In general, one may add water in an amount capable of being taken up by the sulphate as a hydrate. Assuming that the raw material being agglomerated contains the equivalent of three molecules of water of crystallization, three or four more mols of water, or approximately 10% or 12% on the weight of the crushed ferric sulphate will be found sufficient. The amount of water which is added is sufficient to induce agglomeration, but insufficient to form a paste. In general we prefer to restrict the amount of water as much as possible, while at the same time accomplish agglomeration.

If aqueous ferric sulphate is used in lieu of water, especially in the absence of free sulphuric acid, the temperature of the mixing should be restricted in order to avoid the formation of insoluble basic sulphate as is described more fully in our aforementioned application. For this reason the use of water affords a distinct advantage. The restriction of temperature may be attained conveniently by blowing air into the mixer whereby volatilization of water restricts the rise of temperature. Obviously, if the formation of a small amount of insoluble ferric sulphate is not of consequence, this precaution need not be observed.

The agglomerated product which is obtained will be found to be extremely hard, dense, and susceptible to rough handling without suffering from self-abrasion or decrepitation. In this form it will be found to be suited for storage or shipment. However, we prefer to complete the processing by subjecting the product to calcination, observing the same temperature limitations mentioned hereinabove, whereby a substantially acid free anhydrous normal ferric sulphate product is obtained which is very low in insoluble materials especially the basic ferric sulphate and unreacted ferric oxide, and is extremely low in ferrous sulphate.

The presence of a small amount of free sulphuric acid in the material undergoing calcination is not objectionable since it reacts with residual ferric oxide and inhibits the formation of basic sulphate and, lastly, makes possible the oxidation of ferrous sulphate.

To illustrate a specific embodiment of the applications of the principles of our invention, a Simpson mixer of the three foot diameter size is charged with 90 lbs. of pyrite cinder which preferably has been ground so fine that 90% or even from 95% to 97% passes through a two-hundred mesh screen. For this amount of cinder 164 lbs. of 93% sulphuric acid is required, of which 50% to 70% is added rapidly, that is, within one or two minutes while the mixer is in motion. Considerable steam is evolved, together with some dust, especially if the pyrite cinder is not wetted promptly by the acid. The amount of acid which is required at this stage is such as will produce a completely wetted mass of the consistency of ordinary plaster or a thick cement mix, but insufficient to form a thin slurry. The reaction proceeds immediately and the temperature soon rises. As soon as the initial charge of acid has been added the addition of acid is continued, but at a slower rate, such as to assure a plastic flowable mass. As the reaction proceeds the tendency of the mass is to thicken and the rate of addition of acid should be such as to maintain fluidity. Usually the addition of acid at the restricted rate requires approximately 10 minutes. At this point the material will be found to be quite fluid but within about 4 minutes it thickens to the point where the scraper blades which keep the surface of the mill clean and promote the mixing operation, show that the material has reached incipient pastiness. The discharge door at the base of the mill is then opened whereupon the reacted mixture drops into an iron lined bin or pan. The time required for discharging the material usually does not exceed one or two minutes. The temperature of the mass is in the neighborhood of 160° C., provided the mixer has reached an equilibrium temperature from previous batches and is protected from excessive heat losses.

The temperature of the material which is discharged rises to 175° to 180° C. at which point the water present is evolved rapidly in the form of steam. The temperature of the mass is relatively constant at this point, probably due to the volatilization of water. It is to be noted that when 98% acid is used the temperatures of reaction are higher and at this point the mass will have a temperature of approximately 205° to 215° C.

The evolution of steam continues for about one-half hour during which time the mass swells and cracks develop on the surface. The reaction is thus completed.

As the evolution of steam subsides and the temperature drops the mass contracts somewhat and can in this form be removed easily from the pan. Later the mass expands and the material can be removed from the pan only with considerable difficulty. Usually the reaction time after the mixing extends for about 5 hours.

To produce the pellets the material is ground, whereby practically all will pass through an eight mesh screen after which it is introduced into a cement mixer which, preferably, is fitted to receive the ground material and a stream of water, continuously, at one end, and is tilted or otherwise adapted to discharge the agglomerated product from the other end. In this operation, the rotating drum or mixer functions not only to agglomerate the particles of ferric sulphate, but also to classify the finished product, inasmuch as the rotation of the drum stratifies the particles or pellets according to size. The small particles sift to the lower strata, whereas the larger agglomerates remain in the upper layer, from which layer the agglomerated product is withdrawn, preferably continuously. The reacted material will have an analysis substantially as follows:

| | Per cent |
|---|---|
| $Fe_2(SO_4)_3$ | 90.9 |
| $FeSO_4$ | 1.3 |
| $Al_2(SO_4)_3$ | 2.2 |
| $H_2SO_4$ | 2.5 |
| Insoluble | 3.1 | when using pyrite cinder of the following analysis:

| | Per cent |
|---|---|
| $Fe_2O_3$ | 91.3 |
| $FeO$ | 1.5 |
| Insoluble (mostly silica) | 4.3 |
| $Al_2O_3$ | 1.7 |
| $SO_3$ | 1.2 |

The amount of water added to effect agglomeration is equivalent to approximately 12% of the weight of the reacted mass charged into the rotating mixer. Some heat is generated by reason of the addition of water to the ferric sulphate and the agglomerated product will be found to be hot and moist. If desired, it may be dried and cooled by means of a blast of air, or it may be calcined by raising it to a temperature of 400°–450° C. for 30–60 minutes. If desired, the material may be subjected to a higher temperature, say 500°–600° C., but for a shorter period of time to avoid decomposition of the sulphate product. The calcined product will be found to have an analysis which is substantially as follows, and will be found to have the desirable properties of the product which we described in our aforementioned application:

| | Per cent |
|---|---|
| $Fe_2(SO_4)_3$ | 94.5 |
| $FeSO_4$ | 0.3 |
| $Al_4SO_4$ | 2.3 |
| Insoluble | 2.9 |

The pellets of ferric sulphate obtained by our process are more or less globular, have a somewhat roughened surface which, however, pour easily, do not tend to set up or cake readily, and which are of relatively uniform size, free from fines, and all pass through a four mesh screen.

What we claim is:
1. The method of preparing normal ferric sulphate which comprises reacting, in substantially theoretical proportions ferric oxide with sulphuric acid of sufficient concentration to form directly a substantially dry ferric sulphate product, by mixing and grinding the ingredients under con- ditions whereby the temperature of the mixture increases, then causing the mass to complete the reaction while in a quiescent state and under conditions whereby a temperature not substantially less than 140° C. is attained whereby a solid substantially dry product is obtained which is substantially completely reacted to normal ferric sulphate.

2. The method of preparing normal ferric sulphate which comprises reacting, in substantially theoretical proportions ferric oxide with sulphuric acid of sufficient concentration to form directly a substantially dry ferric sulphate product, by mixing and grinding the ingredients under conditions whereby the temperature of the mixture increases, then causing the mass to complete the reaction while in a quiescent state and under conditions whereby a temperature not substantially less than 140° C. is attained whereby a solid substantially dry product is obtained which is substantially completely reacted to normal ferric sulphate then grinding or pulverizing the product and subsequently agglomerating the same by the addition of water whereby pellets of hydrated ferric sulphate are formed and finally calcining the pellets to drive off the water.

3. In the manufacture of normal ferric sulphate, the step which consists in adding and mixing sulphuric acid of sufficient concentration to form directly a substantially dry ferric sulphate product with pulverulent ferric oxide, the addition and mixing being at a rate such that a thoroughly wetted uniform mixture of a flowable plastic consistency is rapidly attained and thereafter maintained until all of the acid has been added, grinding the mass while the reaction mixture remains fluid, the conditions being such that a temperature of at least 140° C. is attained and the amount of acid added being not substantially in excess of that theoretically required to combine with the ferric oxide to form normal ferric sulphate.

4. The method as defined in claim 3 and further characterized in that the mixture of oxide and sulphuric acid is effected in a mill of the edge runner type, such as a Simpson mixer or Chili mill.

5. The method as defined in the claim 1, further characterized in that the ferric oxide is finely ground whereby at least 90% passes through a two-hundred mesh screen.

6. The method as defined in claim 1 and further characterized in that approximately 50 to 70% of the total acid is added to the oxide rapidly whereby a thoroughly wetted mass of plastic, semi-fluid consistency is quickly attained, continuing the addition of the acid at a slower rate whereby the consistency is substantially maintained as the reaction proceeds, discharging the mass from the mixer after all of the acid has been added and while the mixture is still in the flowable state, and causing the mixture to continue the reaction whereby it solidifies into a substantially dry solid as the reaction proceeds to substantial completion without the addition of external heat.

7. The method as defined in the claim 1 and further characterized in that the temperature of the product discharged from the mixer is caused to increase after the material is discharged.

8. The method as defined in claim 1 and further characterized in that the temperature of the mixture in the mill attains approximately 160° C. and the temperature of the mass after it is discharged from the mixer attains approximately 180° C.

9. The method as defined in claim 1 and further characterized in that the ferric oxide is ground to a fineness such that 98% passes through a two-hundred mesh screen and the acid is of approximately 98% concentration.

10. The method as defined in claim 1 and further characterized in that the solid reacted mass is agglomerated by first crushing the product and then adding one of the following: water, dilute sulphuric acid or aqueous ferric sulphate in an amount sufficient to effect agglomeration while the material is agitated in a rotating type mixer wherein stratification of the finished agglomerated material permits its continuous removal from the mixer.

11. The method as defined in claim 1 and further characterized in that the product is calcined at a temperature of 400°-450° C. for a period of 30-60 minutes, or at a higher temperature for a shorter period of time, whereby an anhydrous substantially acid free normal ferric sulphate product is obtained.

12. The method as defined in claim 2 and further characterized in that the solid reacted mass is agglomerated by first crushing the product and then adding one of the following: water, dilute sulphuric acid or aqueous ferric sulphate in an amount equivalent to approximately 10-12% of the weight of the reacted mass while the material is agitated in a rotating type mixer wherein stratification of the finished agglomerated material permits its continuous removal from the mixer.

WILLIAM S. WILSON.
JOHN F. WHITE.